(12) United States Patent
Papenfort et al.

(10) Patent No.: US 8,892,785 B2
(45) Date of Patent: Nov. 18, 2014

(54) PROGRAMMING DEVICE FOR A NETWORK OF CONTROL NODES AND SYSTEM WITH SUCH A PROGRAMMING DEVICE

(75) Inventors: Josef Papenfort, Hüllhorst (DE); Ralf Heitmann, Leopoldshöhe (DE); Gerd Hoppe, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 131 days.

(21) Appl. No.: 12/707,960

(22) Filed: Feb. 18, 2010

(65) Prior Publication Data

US 2010/0217894 A1 Aug. 26, 2010

Related U.S. Application Data

(63) Continuation of application No. PCT/EP2008/060857, filed on Aug. 19, 2008.

(30) Foreign Application Priority Data

Aug. 21, 2007 (DE) .......................... 10 2007 039 428

(51) Int. Cl.
*G06F 3/00* (2006.01)
*G06F 15/177* (2006.01)
*G05B 19/042* (2006.01)
*G05B 19/418* (2006.01)
*H04L 12/24* (2006.01)

(52) U.S. Cl.
CPC ...... *G05B 19/0421* (2013.01); *G05B 19/41845* (2013.01); *H04L 41/0803* (2013.01); *G05B 2219/21081* (2013.01); *G05B 2219/25062* (2013.01); *G05B 2219/25093* (2013.01); *G05B 2219/25096* (2013.01)
USPC ........................................... 710/15; 709/222

(58) Field of Classification Search
CPC ..................... G05B 19/0421; G05B 19/41845; G05B 2212/21081; G05B 2212/25061; G05B 2212/25093; G05B 2212/25096; H04L 41/0803
USPC ............................................... 710/15; 709/22
See application file for complete search history.

(56) References Cited

U.S. PATENT DOCUMENTS 5,923,557 A 7/1999 Eidson
5,978,850 A * 11/1999 Ramachandran et al. .... 709/228

(Continued)

FOREIGN PATENT DOCUMENTS

DE 10200406030 6/2006
EP 0 010 170 A2 9/1979

(Continued)

OTHER PUBLICATIONS

Allen-Bradley NI-FBUS Configurator 1788-FFCT User Manual, Rockwell Automation, Apr. 2002 [online], [retrieved on Mar. 14, 2012] Retrieved from the Rockwell Automation Literature Library using Internet <URL:http://literature.rockwellautomation.com/idc/groups/literature/documents/um/1788-um052_-en-p.pdf>.*

(Continued)

*Primary Examiner* — Eric Oberly (74) *Attorney, Agent, or Firm* — Dorsey & Whitney LLP (57) ABSTRACT

A programming device for a network of control nodes includes a recording module for determining the control nodes connected to the network and a system object module connected to the recording module. The system object module includes a system object model representing the control-node configuration of the network, the system object module being configured to define the communication relations between the determined control nodes on the basis of the system object model. The programming device further includes a configuration output module connected to the system object module for transmitting the communication relations between the control nodes in the network to the control nodes, the communication relations being determined by the system object module.

22 Claims, 5 Drawing Sheets

(56) References Cited

U.S. PATENT DOCUMENTS

| | | | |
|---|---|---|---|
| 6,098,116 | A | 8/2000 | Nixon et al. |
| 6,574,234 | B1 | 6/2003 | Myer et al. |
| 6,711,629 | B1 | 3/2004 | Christensen et al. |
| 6,826,590 | B1 * | 11/2004 | Glanzer et al. ............... 709/200 |
| 7,761,698 | B2 * | 7/2010 | Ichtertz ............................ 713/1 |
| 2004/0027875 | A1 | 2/2004 | Dinges et al. |
| 2009/0125656 | A1 * | 5/2009 | Haas et al. ..................... 710/104 |
| 2009/0306796 | A1 * | 12/2009 | Budmiger ....................... 700/86 |

FOREIGN PATENT DOCUMENTS

| | | |
|---|---|---|
| EP | 0747792 | 12/1996 |
| EP | 1 422 629 A2 | 10/2003 |
| EP | 1436677 | 7/2004 |
| JP | 2001-177558 | 5/1999 |
| JP | 11-126104 | 6/2001 |
| WO | WO-2005/093530 | 10/2005 |
| WO | WO 2005-093530 A2 | 10/2005 |

OTHER PUBLICATIONS

"State of the Art in Factory Control and Requirement Specification for most advanced, most flexible, and most adaptable control of manufacturing systems", http://www.uni-magdeburo.de/iaf/cvs/pabadispromise/dokumente/Del_1_2_Final.pdf Jun. 15, 2006.

Droms, R. , "Dynamic Host Configuration Protocol", http://tools.ieff.org/html/rfc2131 Bucknell University Mar. 1997.

Lawrence, Scott , "Basic: 1.0 Device Definition Version 1.0 for UPnP TM Version1.0", http://www.upnp.org/standardizeddcps/documents/BasicDevice-1.0.pdf Dec. 12, 2002.

Martinez Lastra, Jose L. et al., "Semantic Web Services in Factory Automation: Fundamental Insights and Research Roadmap", *IEEE Transactions on Industrial Informatics*, vol. 2, No. 1 Feb. 2006, 1-11.

Postel, J. , "User Datagram Protocol", http://tools.ietf.org/html/rfc768 Aug. 28, 1980.

Deter, Steffen et al., "PLAP—Pini-based Lightweight Agent Platform for Industrial Environments", *2nd IEEE International Conference on Industrial Informatics*, Jun. 24-26, 2004 , 581-586.

Sugi, Masao et al., "A Holonic Architecture for Easy Reconfiguration of Robotic Assemby Systems", *IEEE Transactions on Robotics and Automation*, vol. 19, No. 3 Jun. 2003 , 457-464.

Swales, Andy , "IP Address Assignment in Large Industrial Networks", http://www.intravue.de/autoip/Auto-IP_paper.pdf Nov. 2003.

Lastra, Jose L., et al., "Semantic Web Services in Factory Automation: Fundamental Insights and Research Roadmap", IEEE Transactions on Industrial Informatics, vol. 2, No. 1, Sep. 2006.

Sugi, Masao, et al., "A Holonic Architecture for Easy Reconfiguration of Robotic Assembly Systems", IEEE Transactions on Robotics and Automation, vol. 19, No. 3, Jun. 2003.

* cited by examiner

PROGRAMMING DEVICE FOR A NETWORK OF CONTROL NODES AND SYSTEM WITH SUCH A PROGRAMMING DEVICE

CROSS-REFERENCE TO RELATED APPLICATIONS

This application is a continuation of PCT Application No. PCT/EP2008/060857 filed Aug. 19, 2008, which claims priority to German Application No. 10 2007 039 428.6, filed Aug. 21, 2007. The entire content of both applications is hereby incorporated by reference.

FIELD

The present invention relates to a programming device for a network of control nodes and a system having such a programming device.

BACKGROUND

Modern concepts for industrial automation are based on the idea of a decentralized control system. The control task to be executed is distributed to the control nodes of the decentralized control system in a geographically and functionally optimal manner. Therein, the control nodes communicate with each other and with the superordinate systems via industrial local networks. Due to the decentralized control system the efforts with regard to communication may be reduced since the individual control nodes take over control tasks relating to their own areas autonomously and only have to communicate with the further control nodes or the superordinate systems, respectively, for the purpose of coordination. Therein, the decentralized control system is based on the basic idea of splitting the automation task into individual modules which are functionally and logically complete and which may then be arranged in close proximity to the process, reducing the efforts for wiring and installation. By the subdivision into modules, the complexity may be reduced so that functions may be realized more easily.

Open systems are another trend used in automation technology, allowing the user to combine automation components from various manufacturers. This gives the user the possibility of making use of the best technical solution for individual subtasks, respectively, and also of choosing the manufacturer having the most favorable prices. An essential requirement to the automation components in open systems is that they have to provide connectability, i.e. the individual automation components have in principal to be capable of exchanging data with each other. Furthermore, open systems require the automation components to be interoperable, i.e. the individual automation components have to comprise defined profiles in order to guarantee for cooperation in executing the automation task. Finally, in open systems the interchangeability of automation components from various manufacturers is required, i.e. the devices from the manufacturers have to comprise the same functional range.

In spite of the trend in automation technology to use decentralized open systems and the cost benefits resulting therefrom, the problem of "return-of-investment" increasingly comes up in automation technology due to the increasingly shortening product lifetimes. Modern products are already manufactured such that they may be easily produced automatically. However, the automation systems for manufacturing the products are generally configured specifically for the product and may therefore only be adapted to changes in the product and the process under high efforts.

SUMMARY

The present invention provides a programming device for a network of control nodes and a system comprising a network with control nodes and a programming device, which allow a flexible system management, in particular with respect to changes in the production and manufacturing process.

One embodiment of the invention provides a programming device for a network of control nodes comprising a recording module for determining the control nodes connected to the network and a system object module connected to the recording module. The system object module comprises a system object model representing the control-node configuration of the network, the system object module being configured to define the communication relations between the determined control nodes on the basis of the system object model. The programming device further comprises a configuration output module connected to the system object module for transmitting the communication relations between the control nodes in the network to the control nodes, the communication relations being determined by the system object module.

Another embodiment of the invention provides a system comprising a network of control nodes and a programming device. At least one control node comprises subscribers. The programming device is configured to determine the communication relations between the control nodes and between the subscribers of the at least one control node in the context of an initialization process.

Another embodiment of the invention provides a programming device for a network of control nodes, comprising a recording module for determining the control nodes connected to the network and a system object module connected to the recording module. The system object module comprising a system object model representing the control-node configuration of the network, the system object module being configured to define the communication relations between the determined control nodes on the basis of the system object model. The programming device further comprises a configuration output module connected to the system object module for transmitting the communication relations between the control nodes in the network to the control nodes, the communication relations being determined by the system object module. The programming device further comprises a system configuration input module connected to the system object module for converting a system description, a product description and a process description into an object model which comprises the system description, the product description and the process description in a standardized format. The programming device further comprises a device-description input/output module connected to the system object module for inputting and outputting the control node descriptions. The system object module is configured to combine the object model which comprises the system description, the product description and the process description in a standardized format with the control node descriptions to form the system object model.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 schematically depicts a network with control nodes and a programming device.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any device.

Figure 1:
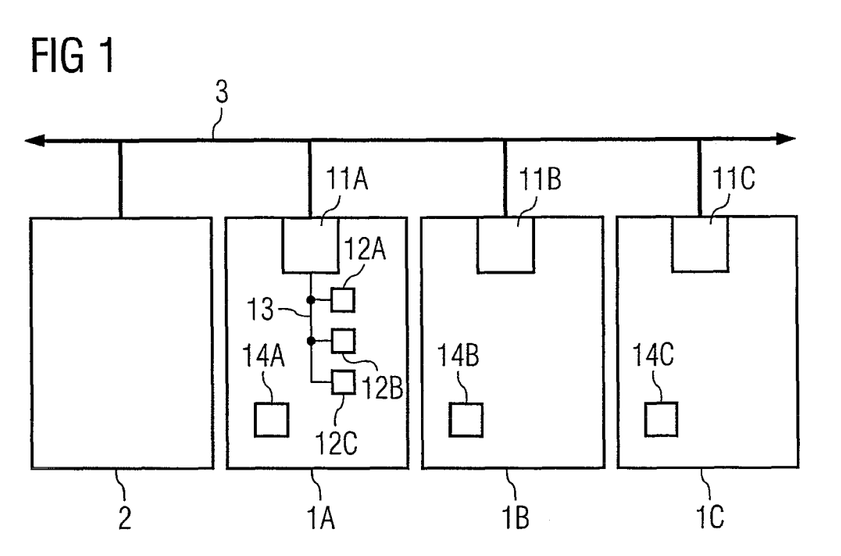

In industrial automation, i.e. in controlling and monitoring technical processes by means of software in computers, decentralized control systems are increasingly applied. In decentralized control systems, the control task is distributed to control nodes. The control nodes communicate with each other and, if necessary, with superordinate systems via industrial local networks. FIG. 1 shows such a decentralized control system having three control nodes 1A, 1B, 1C and one programming device 2 for the configuration and monitoring of the network. The control nodes 1 each comprise a network interface 11 which forms a physical interface to the network. Therein, the control nodes 1 and the programming device 2 are connected to each other via a bus system 3 suitable for industrial demands which is known as a field bus. The main requirement to the field-bus system when used in the process and manufacturing technology is its real-time capability, i.e. the field-bus system has to guarantee that each sent data packet reaches its receiver within a limited guaranteed time.

The control nodes themselves may in turn be subdivided into individual subscribers which are functionally and logically complete. This modularization of the control nodes allows for an optimal decentralization of the control intelligence. Therein, the subscribers are, similar to the superordinate control node, configured such that they practically completely take over the tasks related to their field and only have to communicate with the further subscribers in the control node or, respectively, with further control nodes for reasons of coordination. FIG. 1 shows a control node 1A having three subscribers 12A, 12B, 12C which are connected to the network interface 11 of the control node via an internal bus system 13.

Each control node comprises a control node description which shows the function and communication properties of the control node. This control node description is standardized for all control nodes and is stored as a data file in a memory area 14 of the control node. The individual subscribers in turn, analogously to the control node, comprise their own subscriber description which depicts the communication and function properties of the subscriber and which is stored in a memory area (not depicted) of the subscriber or in the memory area 14 of the control node as a standardized data file.

The problem with conventional decentralized control systems in industrial automation is that the control-relevant contents of the system or, respectively, the hardware of the control nodes have to be adapted under high efforts if the product and manufacturing operation is changed. This adaptation may be considerably reduced by means of the programming device 2 at the system network provided according to the invention.

The programming device 2 which is connected to the control node 1 or, respectively, to the subscribers 12 in the control node via the field bus 3 may in a first step determine the control nodes connected to the network or, respectively, to the subscribers in the control node. By means of a system object model provided in the programming device 2, the programming device may determine the communication relations between the determined control nodes or, respectively, the determined subscribers in the control node and then transmit these communication relations to the control nodes or, respectively, the subscribers in the control node.

Figure 2:
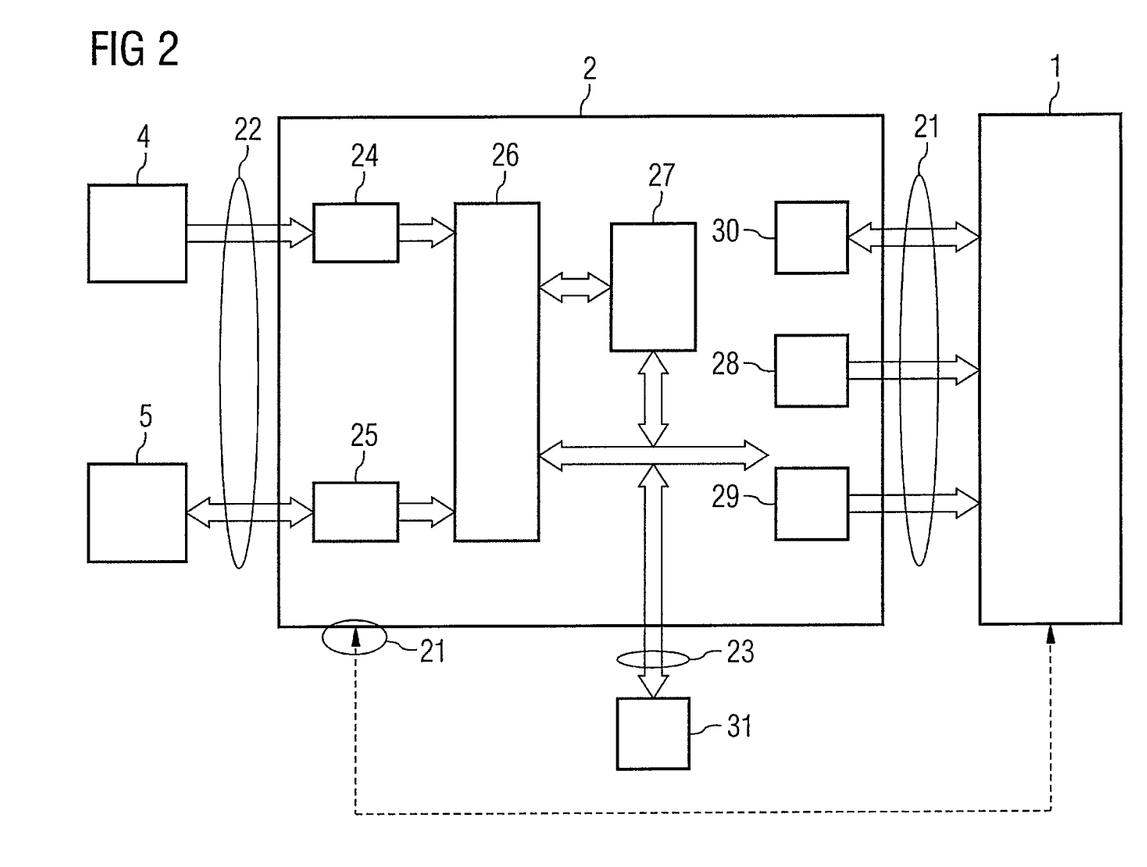
FIG. 2 depicts a programming device architecture.

The configuration of the programming device is schematically depicted in FIG. 2. Therein, the individual components of the programming device may be configured in the form of hardware as well as in the form of software. The programming device 2 comprises three interfaces: a first field-bus interface 21 for connecting the control nodes 1 via the field bus 3 which is configured as a network interface, a data interface 22 and a man-machine interface 23.

The programming device 2 may, via the data interface 22, import a system description and a product and process description of e.g. an engineering system 4 as shown in FIG. 2 with which a system plan for manufacturing a product has been implemented. Therein, the system description comprises the orientation and the sequence of the network subscribers with relation to the entire system and a depiction of the network parameters and communication terminuses.

The system description and the one product and process description is converted into an object model by a system-configuration input module 24 connected to the data interface 22, the object model securing the system description and the product and process description in a standardized format.

The programming device further comprises a device-description input/output module 25 by means of which the programming device 2 may import or, respectively, export control node descriptions or, respectively, subscriber descriptions. Therein, the device-description input/output module 25 may exchange the device and subscriber descriptions with an external data base via the data interface 22 or it may request the device and subscriber descriptions from the control nodes or, respectively, the subscribers in the control node via the data interface 21. Furthermore, there is the possibility of storing back updated device descriptions in the control nodes or, respectively, the subscribers in the control node via the device-description input/output module 25.

The system-configuration input module 24 and the device-description input/output module 25 are connected to a system object module 26 in order to combine the object model which comprises a standardized system description, product description and process description with the control node descriptions or, respectively, the subscriber descriptions to form a system object model. The system object module 26 determines the communication relations between the control nodes 1 or, respectively, the subscribers 12 in the control node on the basis of the standardized system description, product description and process description and the control node description or, respectively, the subscriber description.

A requirement to the communication relations in control systems of industrial automation is a real-time capability, i.e. the decentralized control system has to react to all occurring events under all operating conditions in good time. The exchange of real-time data between the control nodes in the network or, respectively, the subscribers in the control node is preferably carried out in a cyclic manner in order to be able to guarantee a fast and deterministic communication. Non-real-time data, on the contrary, above all parameters which do not have to be evaluated permanently and time-critically are, as required, exchanged in an acyclical manner between the control nodes or, respectively, the subscribers in the control node.

The system object module 26 determines the distribution between cyclical and acyclical data exchange with the communication relations between the control nodes 1 or, respectively, the subscribers 12 in the control node.

The communication between the control nodes in the network is carried out according to the determination by the system object module 26 following the rules of the field-bus protocol, wherein the data to be exchanged between the control nodes 1 are transcribed into data telegrams. Therein, the Ethernet protocol is the preferred communication infrastructure in the field bus, by means of which a high data rate may be achieved. In contrast thereto, the data exchange between the subscribers in the control node is determined preferably in the form of data imaging processes by the system object module 26 in order to allow for a fast data transmission, each subscriber 12 in the control node 1 being configured to implement a direct data access to the data exchanged between the subscribers via the internal bus 13.

The system object module 26 is furthermore connected to a recording module 27 by means of which the control nodes 1 connected to the network or, respectively, the subscribers in the control node 1 may be determined. For this, the recording module 27 may determine the control nodes connected to the network or, respectively, the subscribers in the control node via the field-bus interface 21 since each control node connected to the network or, respectively, each subscriber in the control node comprises a distinct address associated to it via which it may be addressed. Apart from the fixed allocation of field-bus addresses by the control node itself, the control nodes or, respectively, the subscribers in the control node may obtain this address e.g. optionally via the Dynamic Host Configuration Protocol (DHCP) or via auto-IP.

For automatically identifying the control nodes or, respectively, the subscribers in the control node, the recording module 27 may use various mechanisms. The recording module 27 may transmit what is known as a broadcast telegram to all control nodes 1 or, respectively, to all subscribers 12 in the control node 1 which are connected to the network via the field-bus interface 21. The control nodes 1 or, respectively, the subscribers 12 in the network reply to this broadcast telegram with a reply telegram in order to disclose the address of the control node or, respectively, the address of the subscriber in the control node to the recording module 27. The User Datagram Protocol (UPP) may e.g. be used as network protocol for transmitting the broadcast telegram, the UPP representing a minimal connectionless network protocol. As an alternative, the Universal Plug and Play Protocol (UPNP) may as well be applied.

In parallel to the address query, the recording module 27 may as well request the control nodes 1 or, respectively, the subscribers 12 in the control node 1 to transmit to the device-description input/output module 25 the control node description or, respectively, the subscriber description which characterizes the network properties and the functions of the device and which is stored in a standardized format in the control node or, respectively, in the subscribers in the control node.

As an alternative to recording the control nodes 1 or, respectively, the subscribers 12 in the control node via a broadcast telegram, it is also possible that each control node on the network sends an identification telegram with its address or, respectively, with the addresses of the subscribers in the control node to the recording module 27 of the programming device when booting. In addition, the control node 1 may also transmit the control node description or, respectively, the subscriber description to the device-description input/output module 25.

The recording module 27 forwards the addresses of the recorded control nodes or, respectively, the subscribers in the control node and the device-description input/output module 25 as well as the control node description or, respectively, the subscriber description to the system object module 26. The system object module 26 compares the number of the control nodes or, respectively, subscribers in the control node intended according to the system object module with the recorded control nodes or, respectively, subscribers in the control node. If the recorded control nodes or, respectively, subscribers in the control node do not completely cover the number of control nodes or, respectively, subscribers intended according to the system description, the system object module 26 outputs an error message via the man-machine interface 23. The further configuration process of the system by the programming device 2 is then interrupted.

The system object module 26 may furthermore compare the control node or, respectively, subscriber descriptions which have been read out from the data base 5 with the currently recorded control node description or, respectively, subscriber description and it may, if necessary, correspondingly update the control description or, respectively, the subscriber description stored in the data base 5 or in the control nodes or subscribers, respectively.

The communication relations between the control node 1 in the network or, respectively, the subscribers 12 in the individual control nodes which have been determined by the system object module 26 on the basis of the object model which has been standardized by the system-configuration input module 24 and on the basis of the control node description or, respectively, the subscriber description which has been read in via the recording module 27 or via the device-description import/export module 25 each indicate the transmitter and the receiver, the sort of data transmission and the type of data. Therein, the data to be transmitted are subdivided into product parameters, process parameters and control parameters, incidental data and process data.

The product parameters, process parameters and control parameters are transmitted acyclically before the production process for the parameterization between control nodes or, respectively, their subscribers. They are not critical with respect to real time.

Incidental data are used in order to inform application programs in the control nodes or, respectively, subscribers in the control nodes about incidents. Such incidental data may be the change of a process signal, the exceeding of a threshold value, the intervention of an operator, the occurrence of an error etc. The incidental data are exchanged acyclically between the subscribers of the communication relations and are not critical with respect to real time.

In contrast thereto, process data are generally functional data such as sensor data which are necessary for the process and manufacturing cycle and critical with regard to real time. These process data are preferably exchanged in a cyclic manner between the subscribers in order to guarantee a real-time transmission. However, the process data may also be exchanged between the subscribers in an acyclic manner. Such process data which are transmitted acyclically are process and product parameters for the control nodes or, respectively, for the subscribers in the control node for executing the application programs.

The system object module 26 furthermore determines with the communication relations how data transmission is to be effected. In a data transmission between the control nodes or, respectively, the subscribers in a control node to subscribers in another control node, data transmission is effected according to the field-bus protocol, wherein the system object module determines the telegram format and therein particularly the data structure in the telegram. The control nodes 1 then convert the process data to be transmitted into the predetermined telegram format by means of their network interface unit 11.

When communication is only to take place between subscribers in a control node, the system object module 26 determines data transmission to be a transparent local communication, wherein the subscribers in the control node carry out data imaging processes in which a direct data access of the subscribers to the transmitted control node process image is implemented. In contrast to network transmission, no copying of the data into data telegrams is necessary which leads to a particularly fast data transmission between the subscribers of a local node.

The system object module 26 delivers the data record with the determined communication relations to a configuration-output module 28 which converts the communication relations determined by the system object module 26 into telegrams in order to transmit them to the control nodes 1 or, respectively, the subscribers 12 in the control node by means of the field-bus interface 21 and the field bus 3.

Furthermore, a process-parameter output module 29 connected to the system object module 26 is provided in the programming device 2 which converts the process and product parameters distributed to the individual subscribers or, respectively, control nodes by the system object module 26 into telegrams and transmits them to the control nodes 1 or, respectively the subscribers 12 in the control nodes via the field-bus interface 21 and the field bus 3.

Additionally, the programming device 2 may comprise a monitoring module 30 which is connected to the control node 1 via the field-bus interface 21 and the field bus 3 in order to monitor the status of the control nodes or, respectively, of the subscribers in the control node during machine operation and to carry out an error recordation, wherein the errors may be transmitted via the field-bus interface 21 or displayed by the man-machine interface 23.

The man-machine interface 23 of the programming device 2 preferably comprises an operating interface 31 for the operator by which a complete system description, product description and process description is implemented preferably in a graphic manner. Herein, the control nodes or, respectively, the subscribers in the control node, the network topology and the network parameters, the control node and subscriber descriptions and the process and product parameters may be depicted. Furthermore, the data records determined by the system object module 26 may be displayed on the operator interface 31 together with the communication relations. Further, the system object model, the system, product and process descriptions, the descriptions of individual control nodes, but also the entire system may be visualized on the operator interface 31. The operator interface 31 may be configured in such a way that the individual depictions may also be altered by the operator. Those entries are then interfaced back to the system object module 26 via the man-machine interface 23.

Figure 3A:
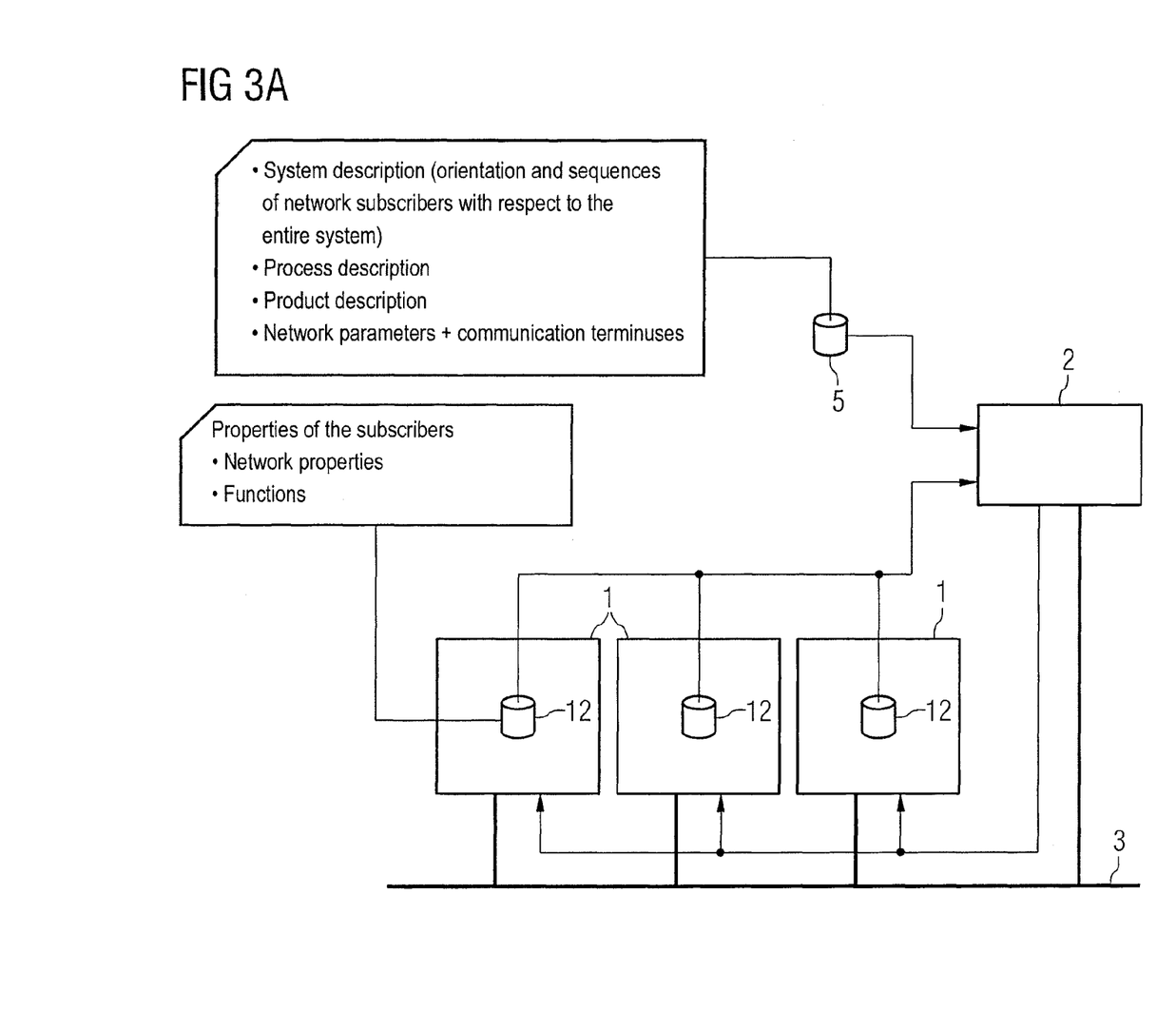
FIGS. 3A-3C show a recognition phase, a configuration phase and a machine-operation phase in a network.
Figure 3B:
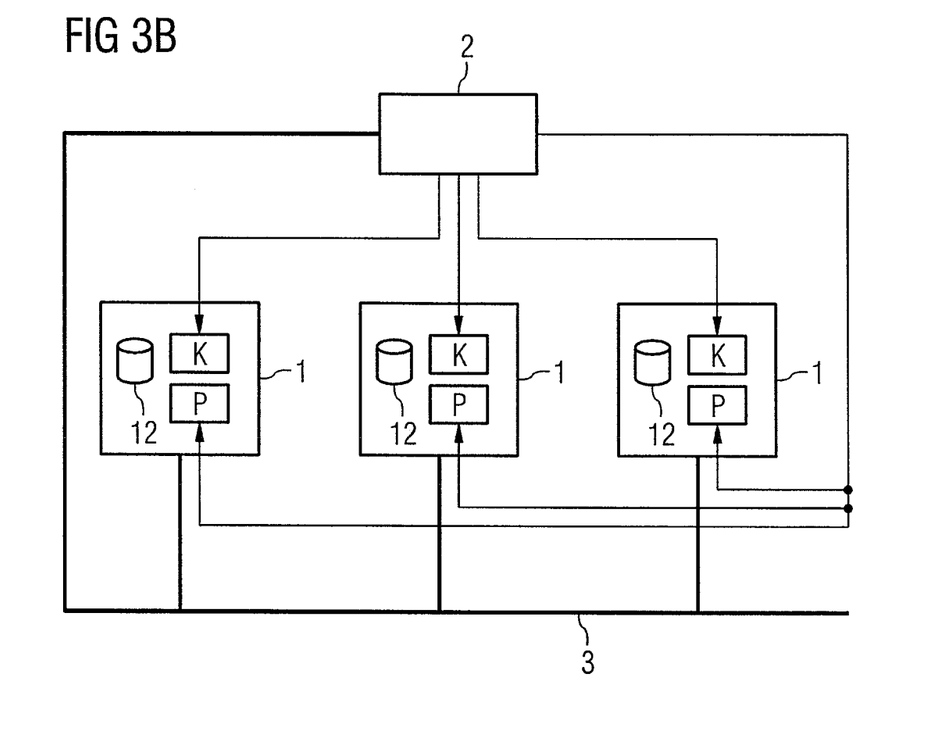
Figure 3C:
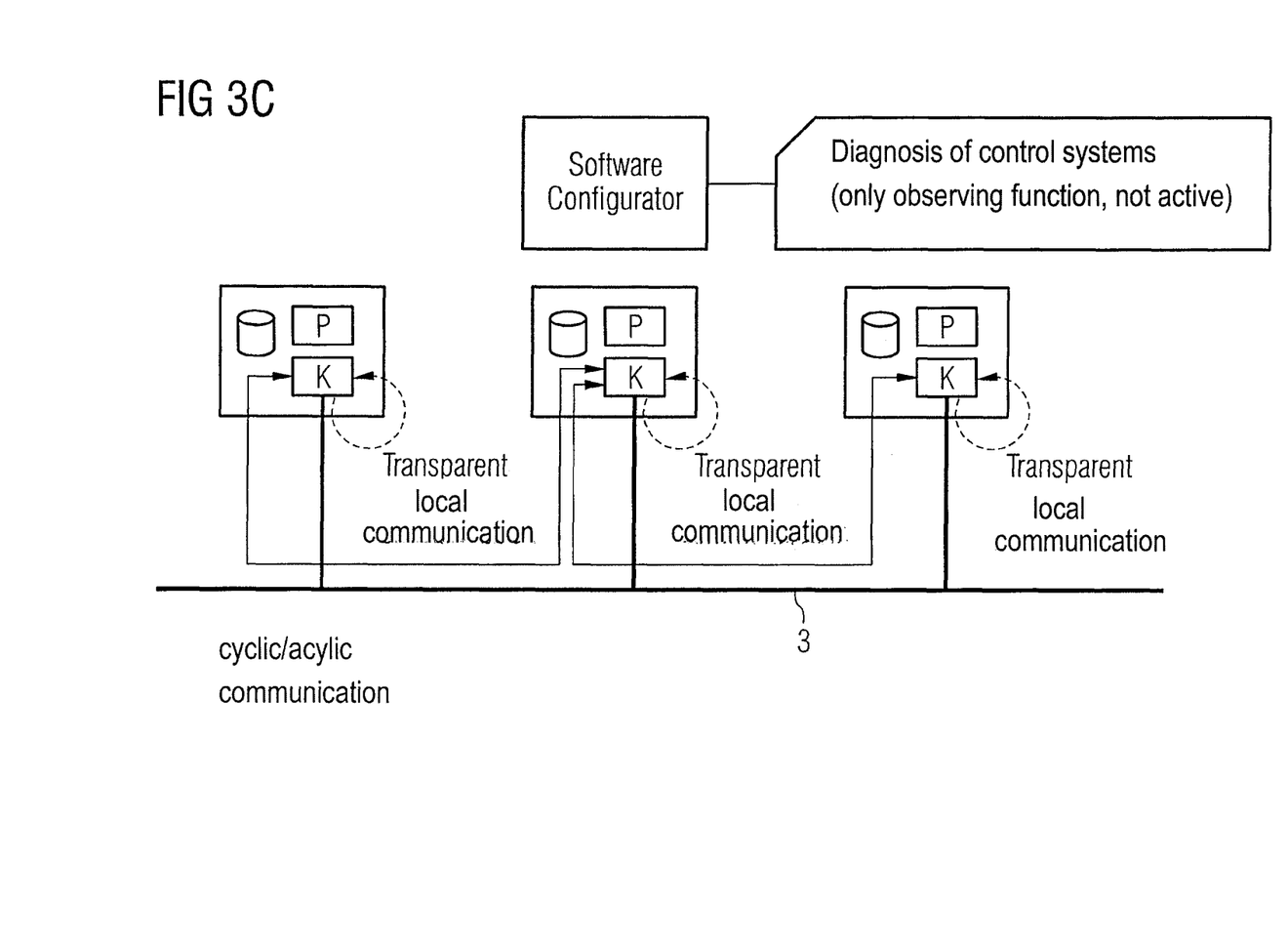

FIGS. 3A to C show various operation modes of the decentralized control system depicted in FIG. 1 having a network of control nodes 1 and a programming device 2, as is shown in detail in FIG. 2. In FIGS. 3A and 3B, the two initialization steps of the programming device 2, i.e. the identifying phase and the configuration phase of the decentralized control system are shown, and in FIG. 3C, machine operation is depicted. The corresponding data exchange being implemented is indicated in the figures by arrows.

In the identifying phase depicted in FIG. 3A, the programming device 2 imports the system description which has e.g. been generated by means of an engineering system 5 in order to carry out a certain production and manufacturing process. The system description comprises the orientation and the sequence of the subscribers on the network with regard to the entire system for the execution of the desired production and manufacturing process. Furthermore, the programming device 2 imports a process description and a product description as well as information on the network parameters and the communication terminus from the engineering system.

At the same time, the programming device 2 records the control nodes 1 connected to the network or, respectively, the subscribers 12 in the control node. The control nodes 1 or, respectively, the subscribers 12 in the control node receive a valid address e.g. from a server (not shown) via DHCP or auto-IP when booting at the field bus 3. This valid address, however, may already have been stored in the control node or, respectively, in the subscribers in the control node. The control nodes or, respectively, the subscribers in the control node either automatically during booting at the network or upon request by the programming device, e.g. by means of a broadcast telegram, transfer this address to the programming device 2.

In parallel to identifying the subscriber connected to the network, the programming device 2 also records the subscriber properties. The control node and subscriber descriptions characterize the network properties of the subscribers as well as their functions. The programming device 2 receives these control node and subscriber descriptions either from an external data base (not shown) or directly from the control node or, respectively, the subscribers in the control node via the field bus 3.

The programming device 2 by means of the man-machine interface displays the imported information preferably in an editable form on the operating interface so that the operator may carry out modifications, e.g. in the control node and subscriber descriptions, the product and process parameters and the network topology and its parameters.

In the configuration phase following the identifying phase and being depicted in FIG. 3B, the programming device 2 determines the communication parameters between the subscribers on the network. Herein, the incident and data flows are defined and it is determined whether data transmission is carried out cyclically, i.e. capable of real time, or acyclically. The determined data records with the communication relations K is then read into the control nodes or, respectively, the subscribers in the control node by the programming device 2 via the field bus 3. Herein, the kind of data transmission, the type of date and the transmitter or, respectively, the receiver of the data is prescribed to the subscribers. Additionally, the programming device 2 transmits the process parameters P which are important for the individual control nodes or, respectively, subscribers in the control node for executing the production and manufacturing process.

Having finished the initialization steps shown in FIGS. 3A and 3B, the network switches into machine operation in order to carry out the desired production and manufacturing process. In this operation mode, the programming device 2 is not needed by the decentralized control system anymore, as shown in FIG. 3C. The programming device 2 is then either switched off or it has observing functions in the production and manufacturing process, this means it serves for error monitoring and diagnosis. However, the programming device may also have the function of a master computer and thus be integrated into the controlling process.

During the production and manufacturing process, the control nodes or, respectively, the subscribers in the control node autonomously exchange process and incidental data via the communication relations which have been pre-configured by the programming device 2. In a data exchange between subscribers in a control node, data transmission is implemented transparently by data imaging processes with a direct data access of each subscriber to the control node process image which is transmitted between the subscribers. In data transmission between the control nodes in the network, data transmission is carried out according to the prescribed network protocol, wherein the control node data are converted into network telegrams by the corresponding network interfaces.

In a system for decentralized controlling which comprises a network of control nodes, a programming device is provided according to the invention which determines the communication relations between the control nodes in the network. For this, the programming device comprises a recording module in order to determine the control nodes connected to the network. Furthermore, a system object module which is connected to the recording module is provided, the system object module containing a system object model representing the control node configuration of the network and the system object model determining the communication relations between the determined control nodes. In the programming device, a configuration module is connected to the system object module, the configuration module transmitting the communication relations between the control nodes in the network which have been determined by the system object module to the control nodes.

The inventive configuration allows for a decentralized control system in the form of an open system having a high compatibility with respect to the control nodes. Changes in the production and manufacturing process, in particular an enlargement of the production and changing products may be implemented in the decentralized control system in an easy manner and without high efforts by means of the inventive programming device since the programming device may determine the communication relation between the individual control nodes and thus adapt it to the desired production and manufacturing process.

The system object module in the programming device may be configured in such a way that the communication relations between the subscribers in the control node are also determined on the basis of the system object module and then transmitted to the control node by means of the configuration module. By means of this configuration, a further increased flexibility of the decentralized control system is achieved since the process flow in the control node may be adapted to the desired production and manufacturing processes without having to carry out programming work on the control node itself.

A data transmission between the control nodes in the network may be carried out in the form of data packets which are transmitted on the network, the control nodes being configured to convert a control node process image or further data which do not belong to the process image into data telegrams. This configuration of data traffic between the control nodes allows for the communication relations between the control nodes to be configured in a simple and flexible manner in order to achieve an optimal adaptation to the production and manufacturing processes.

The data transmission between the subscribers in the control node may be carried out in the form of data imaging processes, wherein each subscriber in the control node is configured to directly access the control node process image transmitted between the subscribers or further data which do not belong to the process image. This approach in data transmission provides for a fast data exchange in the control node. In particular it is possible to carry out the data imaging process in a cyclic and in a deterministic manner.

While the foregoing is directed to embodiments of the invention, other and further embodiments of this invention may be devised without departing from the basic scope of the invention, the scope of the present invention being determined by the claims that follow.

The invention claimed is:

1. A programming device for a network of control nodes, the programming device comprising:
    a network interface;
    a data interface;
    a recording module connected to the network interface, the recording module configured to automatically determine the control nodes connected to the network via the network interface;
    a system configuration input module connected to the data interface, the system configuration input module configured to convert a system description, a product description and a process description into an object model which comprises the system description, the product description and the process description in a standardized format;
    a device-description input/output module connected to the data interface, the device-description input/output module configured to input and output control node descriptions;
    a system object module connected to the system configuration input module, the device-description input/output module and the recording module, the system object module configured to combine the object model in the standardized format with the control node descriptions to form a system object model representing the control-node configuration of the network in a configuration phase, autonomously without operator intervention, the system object module further configured to define communication relations between the determined control nodes in the network on the basis of the system object model, each communication relation indicating a transmitting control node and a receiving control node, a sort of data transmission and a type of data; and a configuration output module connected to the system object module and to the network interface, the configuration output module configured to transmit the communication relations determined by the system object module to the control nodes via the network interface.

2. The programming device according to claim 1, wherein the system object module is configured to define the communication relations between the determined control nodes in the network by the addresses of the corresponding control nodes and the kind of data transmission to be carried out.

3. The programming device according to claim 1, wherein the system object module is configured to further determine the communication relations between subscribers in the control node on the basis of the system object model, and wherein the configuration output module connected to the system object module is configured to transmit the communication relations between the subscribers in the control node which have been determined by the system object module to the control node.

4. The programming device according to claim 3, wherein the system object module is configured to determine the communication relations between the subscribers in the control node on the basis of the system object model by means of data imaging processes between the subscribers.

5. The programming device according to claim 1, wherein the system configuration input module is further configured to enter control node parameters via the data interface and to convert the control node parameters into the system object model.

6. The programming device according to claim 5, further comprising a process-parameter output module connected to the network interface, the process-parameter output module configured to output the control node parameters to the control nodes via the network interface.

7. The programming device according to claim 1, further comprising the device-description input/output module configured to input control node descriptions via the network interface and to output the control node descriptions to the system object module, the system object module configured to additionally define the communication relations between the control nodes on the basis of the control node descriptions forwarded by the device-description input/output module.

8. The programming device according to claim 1, further comprising a monitoring module connected to network interface, the monitoring module configured to monitor the control nodes via the network interface.

9. A system for a network of control nodes, at least one of the control nodes comprising subscribers, the system comprising:
 a programming device comprising a network interface, a data interface, a recording module, a system configuration input module, a device-description input/output module, a system object module, and a configuration output module;
 wherein in an initialization mode, the initialization mode having an identifying phase and a following configuration phase,
  the recording module automatically determines the control nodes and the subscribers of the at least one control node connected to the network in the identifying phase,
  the system configuration input module converts a system description, a product description and a process description into an object model which comprises the system description, the product description and the process description in a standardized format,
  the device-description input/output module inputs and outputs control node descriptions,
  the system object module combines the object model in the standardized format with the control node descriptions to form a system object model representing the control-node configuration of the network in the configuration phase, autonomously without operator intervention, and defines communication relations between the determined control nodes in the network on the basis of the system object model, each communication relation indicating a transmitting control node and a receiving control node, a sort of data transmission and a type of data, and
  the configuration output module transmits the communication relations determined by the system object module to the control nodes via the network interface; and
 said communication relations defining incident and data flows between the subscribers and determining whether data transmission between the subscribers is carried out cyclically or acyclically.

10. The system according to claim 9, wherein the recording module of the programming device is configured to determine the control nodes connected to the system by sending a broadcast telegram within the connected network, wherein the control nodes connected to the network reply to the broadcast telegram with an identification telegram.

11. The system according to claim 9, wherein each control node sends an identification telegram to a recording module of the programming device when booting.

12. The system according to claim 9, wherein each control node is provided with a valid address which is definitely stored.

13. The system according to claim 9, wherein each control node is provided with a valid address which is obtained via any of DHCP and auto-IP and is then transmitted to the programming device.

14. The system according to claim 9, wherein a data transmission between the control nodes in the network is carried out in the form of data packets which are transmitted on the network, wherein the control nodes are configured to carry out a conversion of a control node process image to data telegrams.

15. The system according to claim 9, wherein a data transmission between the subscribers in the control node is implemented in the form of data imaging processes, wherein each subscriber in the control node is configured to carry out a direct data access with the control-node process image which is transmitted between the subscribers.

16. A programming device for a network of control nodes, the programming device carrying out a process sequence and comprising:
 a network interface;
 a data interface;
 a recording module connected to the network interface, the recording module configured to determine the control nodes connected to the network;
 a system configuration input module connected to the data interface, the system configuration input module configured to convert a system description, a product description and a process description into an object model which comprises the system description, the product description and the process description in a standardized format;

a device-description input/output module connected to the data interface, the device-description input/output module configured to input and output control node descriptions;

a system object module connected to the system configuration input module, the device-description input/output module and the recording module, the system object module configured to combine the object model in the standardized format with the control node descriptions to form a system object model representing the control-node configuration of the network in a configuration phase, autonomously without operator intervention, the system object module further configured to define communication relations between the determined control nodes in the network on the basis of the system object model, each communication relation indicating a transmitting control node and a receiving control node, a sort of data transmission and a type of data, the system object module further configured to compare a number of control nodes intended according to the system description with a number of the control nodes determined by the recording module, wherein the process sequence of the programming device is interrupted in case a discrepancy is detected with respect to the number of control nodes; and a configuration output module connected to the system object module and the network interface, the configuration output module configured to transmit the defined communication relations between the determined control nodes in the network to the respective control nodes.

17. The programming device according to claim 16, wherein the system object module is configured to define the communication relations between the determined control nodes in the network by the addresses of the corresponding control nodes and the kind of data transmission to be carried out.

18. The programming device according to claim 16, wherein the system object module is configured to further determine the communication relations between subscribers in the control node on the basis of the system object model, and wherein the configuration output module connected to the system object module is configured to transmit the communication relations between the subscribers in the control node which have been determined by the system object module to the control node.

19. The programming device according to claim 18, wherein the system object module is configured to determine the communication relations between the subscribers in the control node on the basis of the system object model by means of data imaging processes between the subscribers.

20. The programming device according to claim 16, further comprising a process parameter output module connected to the system object module for outputting process and product parameters to the control nodes.

21. The programming device according to claim 16, further comprising a monitoring module connected to the system object module for monitoring the control nodes.

22. The programming device according to claim 16, further comprising a processing module for processing any of the system object model, the system description, the product description and the process description.

\* \* \* \* \*